Sept. 4, 1962  W. E. LESSING ETAL  3,052,498
TARPAULIN FASTENING MEANS
Filed Aug. 19, 1959  2 Sheets-Sheet 1
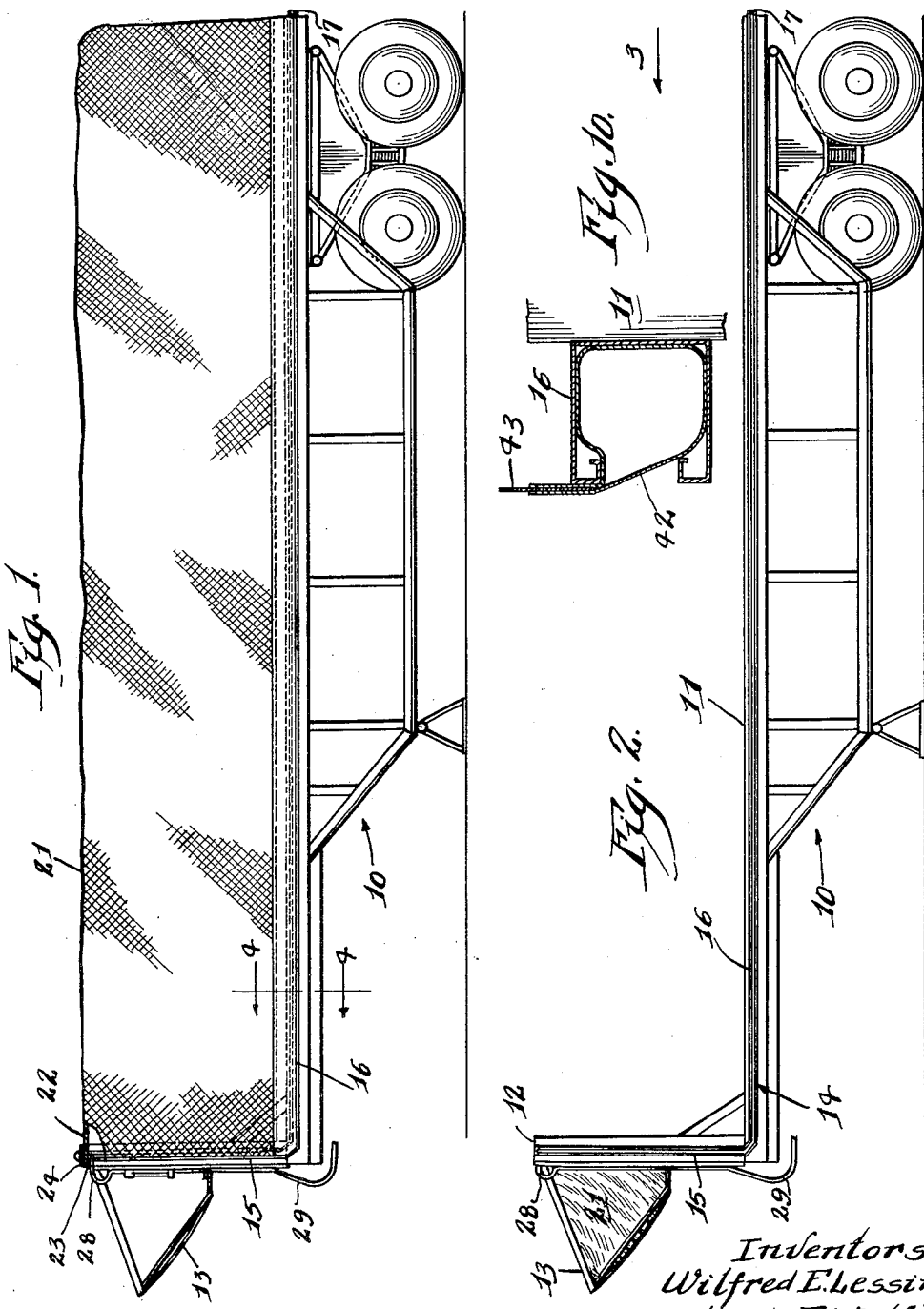
Inventors.
Wilfred E. Lessing.
Lloyd J. Wolf.

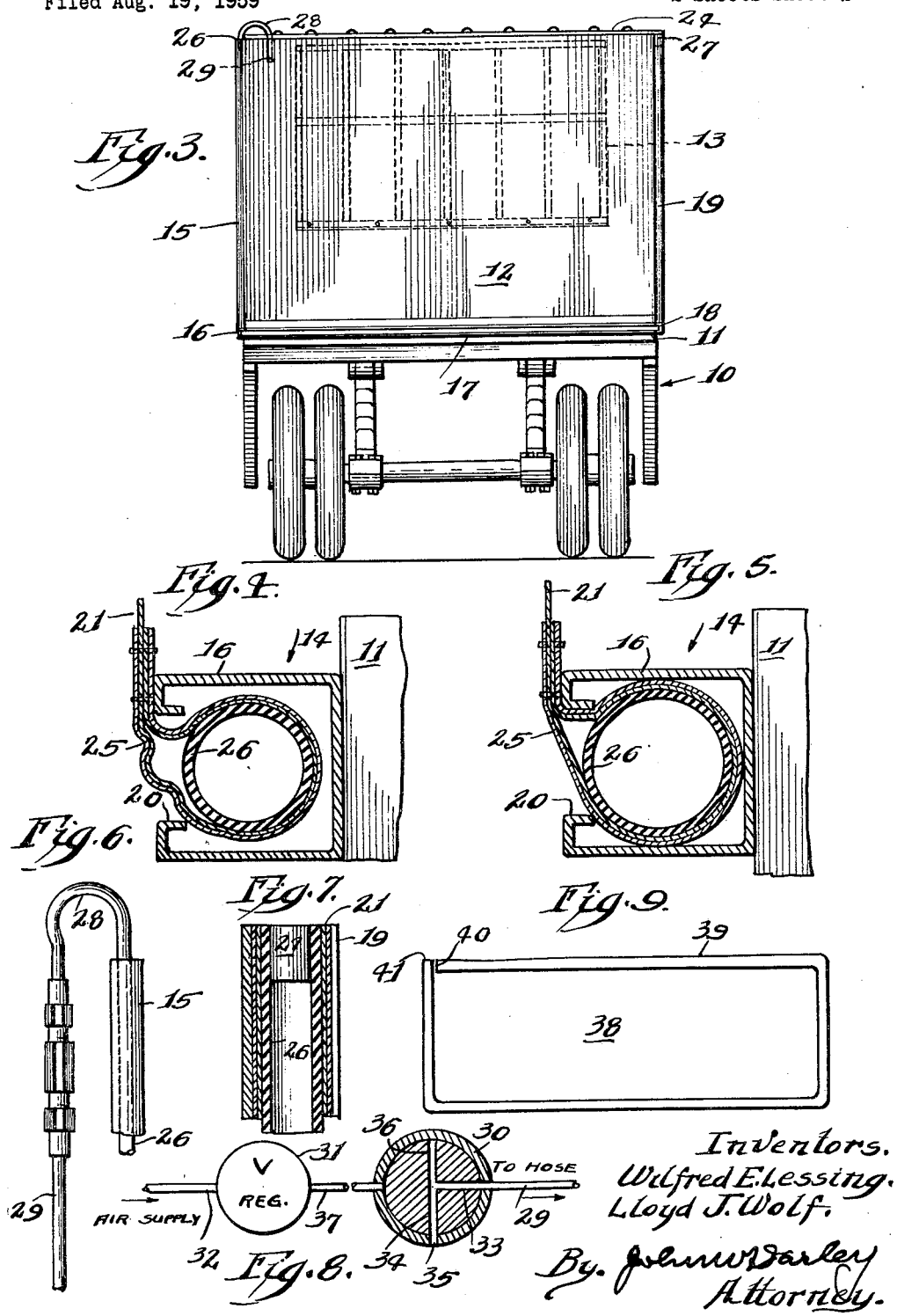

3,052,498
TARPAULIN FASTENING MEANS
Wilfred E. Lessing, 215 N. Peak St., and Lloyd J. Wolf, 4580 Bordeaux St., both of Dallas, Tex.
Filed Aug. 19, 1959, Ser. No. 834,689
3 Claims. (Cl. 296—100)

Our invention relates to means for fastening a covering, such as a tarpaulin, to a convenient base or structure which may be fixed or movable.

Tarpaulin coverage for goods of any kind which rest on a fixed base for storage or on a vehicle bed for transport is usually effected by rope lashing the tarpaulin in position, the rope being secured to the base or bed at spaced intervals. Between such intervals, the tarpaulin is unconnected to the base or bed so that the covered goods are exposed to the entrance of dust and moisture. This condition is particularly true in the case of vehicles by reason of their movement and, where the load is composed of bags of cement, for example, or any other type of goods that can be damaged or destroyed by contact with water, present methods of tarpaulin attachment have proved unsatisfactory.

It is therefore the principal object of our invention to provide a tarpaulin which is constructed and arranged in connection with the associated goods supporting base or article to be covered to establish a dust proof and water tight connection therewith.

A further object is to provide an arrangement of the character indicated wherein at least a part of the marginal edge of the tarpaulin is conditioned to provide a locked, inflatable and continuous, sealing connection with the base and which connection may be quickly and easily deflated to permit removal of the tarpaulin.

These and further objects of the invention will be set forth in the following specification, reference being had to the accompanying drawings, and the novel means by which the objects are effectuated will be definitely pointed out in the claims.

In the drawings:

FIG. 1 is a side elevation of a typical trailer vehicle showing the tarpaulin in goods covering position.

FIG. 2 is a side view similar to FIG. 1, but showing the tarpaulin in partially detached and folded position in a basket carried by the headboard of the trailer to enable loading or unloading thereof.

FIG. 3 is an end view of the trailer looking in the direction of the arrow 3 in FIG. 2.

FIGS. 4 and 5 are enlarged sections along the line 4—4 in FIG. 1 showing the fastening means in deflated and inflated condition.

FIG. 6 is an enlarged elevation of the hose connection to a fluid pressure supply as viewed in FIG. 1.

FIG. 7 is an enlarged, sectional elevation of the plugged end of the hose as viewed in FIG. 3.

FIG. 8 is a schematic of the piping system for connecting the inflatable hose to the air supply of the vehicle air brake system.

FIG. 9 is a plan view of a typical goods supporting base or article to be covered, fixed or movable, showing another application of the invention thereto, the tarpaulin being omitted.

FIG. 10 is a section similar to FIG. 5, but showing a modified hem loop which per se is conditioned for inflation.

For purpose of description, the invention will be considered as applied to a typical open, flat bed trailer which is conventionally coupled to a tractor for transport. In its broadest aspect, however, the invention is concerned with the releasable connection of a tarpaulin to any type of body or base, whether fixed or movable, and including releasable attachment to the goods per se.

Referring to FIG. 2, the numeral 10 designates a conventional, vehicle trailer having an open bed 11 and a vertical headboard 12 which has attached to the forward side thereof a basket 13. A slotted, hollow member 14 is attached with a dust proof and water tight connection to the vertical end faces of the headboard 12 and to the longitudinal sides and end of the bed 11. Specifically, the member 14 includes a part 15 extending from the upper end of the left end face of the headboard 12 as viewed in FIG. 3 and downwardly therealong, parts 16, 17 and 18 extending successively along one longitudinal side, end and the other longitudinal side, respectively, of the bed 11, and a part 19 (see FIG. 3) extending upwardly along the right end face of the headboard 12 to terminate at the upper end of the latter.

Referring to FIG. 4, the member 14 possesses a parti-box section which includes a slot 20 that extends the length of the member 14 and provides communication from the outside with the interior of the member. The member 14 may be made from a commercially available material known as "Unistrut," or a slotted, cylindrical pipe may be used, or an appropriately shaped aluminum extrusion. In the drawings, the slot 20 is shown facing outwardly from the bed 11 and headboard 12, but this is a matter of choice since the member 14 may be fastened to the trailer 10 with the slot 20 facing upwardly or downwardly.

The tarpaulin 21 is preferably form fitted to the load on the trailer and is composed of a suitable material that is dust and waterproof. Being form fitted as shown in FIG. 1, the tarpaulin 21, when in load covering position, has the shape of an inverted box whose forward end is omitted since closure in this locaion is provided by the headboard 12. The forward, horizontal, marginal edge 22 of the tarpaulin 21 is conventionally and permanently attached in a dust proof and water tight manner to the horizontal, upper edge 23 of the headboard 12 as indicated by the numeral 24. This particular arrangement enables the tarpaulin 21, when released from the member 14 as presently described, to be folded and packed in the basket 13 as shown in FIG. 2.

The other marginal edges of the tarpaulin 21 are suitably hemmed to provide a continuous loop 25 having a length not less than that of the member 14. A continuous, inflatable hose 26 of like length is permanently positioned within the loop 25 and one end thereof is permanently plugged at 27 (see FIGS. 3 and 7) while the opposite end connects through a gooseneck 28 (see FIGS. 1 and 2) with a hose 29 connected as presently described to the vehicle brake air supply.

With the load in position on the bed 11 and the tarpaulin 21 in the basket 13 as shown in FIG. 2, the latter is withdrawn therefrom and draped generally and uniformly over the load with its looped, hose filled, marginal edges disposed respectively adjacent the parts 15, 16, 17, 18 and 19 which compose the box member 14. For the particular installation shown, the foregoing disposition of the tarpaulin 12 places the plugged end of the hose 26 adjacent the upper right corner of the headboard 12 as viewed in FIG. 3 while the gooseneck connection 28 is adjacent the upper left cover of the headboard. Beginning at either end of the member 14, i.e., at either of the indicated corners of the headboard 12, the hose filled loop 25 is pushed through the slot 20 into the interiors of the parts comprising the member 14. This step is easily and quickly accomplished by applying hand pressure to the loop 25 and moving the hand along until the insertion is completed. The entire tarpaulin loop 25 will then occupy the position shown in FIG. 4. The diameter of the loop 25 measured across the hose 26 is preferably slightly larger than the width of the slot 20. This relation does not affect the indicated easy insertion and withdrawal and yet provides sufficient retention pending inflation of the hose 26. Also, the loop 25 is sized in relation to the hose 26 when inflated to secure the desired seal with the member 14.

Suitably supported beneath the vehicle bed 11 or in any other convenient location is the pressure control system shown schematically in FIG. 8. The hose 29 which supplies pressure to the hose 26 is connectible successively through a three-way valve 30 and a pressure regulating valve 31 with a pipe 32 that connects with the usual air supply (not shown) for the vehicle brakes.

With the valve 30 in the position shown in FIG. 8 and the marginal edge loop 25 of the tarpaulin 12 inserted in the member 14 as shown in FIG. 4, the hose 26 connects through the hose 29 and radial passages 33 and 34 in the valve 30 with an exhaust port 35 in the casing of the latter valve so that the hose 26 is devoid of pressure. To lock the tarpaulin 12 in position, the valve 30 is rocked counterclockwise to thereby close the port 35 and establish a pressure connection through the valve passages 36 and 34 with the hose 29, the passage 36 then connecting through a hose or pipe 37 with the pressure regulating valve 31. The hose 26 is thus expanded to the position shown in FIG. 5 which not only locks in position the indicated marginal edges of the tarpaulin 12, but accomplishes this result in a dust proof and water tight manner since parts of the loop 25 sealably contact interior surfaces of the member 14. The pressure regulating valve 31 provides a convenient method of obtaining a suitable inflating pressure below normal brake reservoir pressure.

Any type of fluid pressure, gas or liquid, is usable for inflation purpose, the arrangement above merely employing a conveniently available air pressure supply.

When it is desired to remove the tarpaulin 12 for access to the load, the valve 30 is restored to the position shown in FIG. 8 to thereby deflate the hose 26 and permit the easy and rapid withdrawal of the hose filled loop 25 through the slot 20. The tarpaulin 12 may then be piled in the basket 13.

The invention is not restricted to the particular arrangement described above, i.e., where a part of the tarpaulin 12 is permanently fastened to the body or base to be covered and is further not restricted to vehicle application. On the contrary, the attachment is applicable to any base or bed on which goods are stored, or to any goods per se, such as a boat which it is desired to cover for a protracted period. In such cases, the tarpaulin may be generally mounted with one edge permanently attached as discussed above, or the arrangement may be modified to permit complete removal of the tarpaulin 12 from the base or goods.

The latter is schematically shown in FIG. 9 wherein the numeral 38 designates in plan view a base or bed, or an article or structure of some kind, the marginal outline not being restrictive. For convenience in description, the numeral 38 will be considered as designating a bed and around the marginal edge face thereof is attached a member 39 shaped like the member 14. This attachment is continuous except, by way of example, at the upper left hand corner of the base 38. The end of the member 39, designated by the numeral 40, may receive the plugged end of the tarpaulin hose (not shown), but corresponding to that shown in FIGS. 3 and 7, while the end 41 would receive the gooseneck end of the hose as described for FIG. 1, or be otherwise connected to the fluid supply. The locations 40 and 41 are not restricted to the corner shown, but may be at any point around the member 38. With this arrangement, the tarpaulin may be completely removed since all of its edges are releasably connected to the bed 38.

The variation in FIG. 10 contemplates the elimination of the hose 26 and the utilization of a hem loop 42 of inflatable material, this loop being attached to the tarpaulin 43. This loop would be closed at one end and conventionally attached to the goose neck 28 or other supply connection at the other end. The loop 42 may be composed of material which is distended when inflated, such as any of the conventional rubbers, or any fabric suitably treated to retain air, the term fabric including any suitable sheet material. In the latter event, the loop 42 would be formed with sufficient excess material to insure that, when inflated, it would contact the interior surfaces of the member 16 as shown generally in FIG. 10, it being understood that the particular section of the member 16 as indicated is not restrictive.

We claim:

1. The combination of a vehicle body, a tarpaulin for covering freight carried by the body, a hollow member having a continuous slot extending lengthwise of the member and sealably fastened to the body, a continuous loop on the tarpaulin, a continuous, transversely inflatable hose plugged at one end extending through the loop, the hose-filled loop being sized for insertion within and withdrawal from the member through the slot when the hose is deflated, and means for supplying pressure to the opposite end of the hose when the loop is in the member to transversely expand the hose for sealably and lockably contacting the loop with the member.

2. The combination of a vehicle body, a tarpaulin for covering freight carried by the body, a hollow member having a continuous slot extending lengthwise of the member and sealably fastened to the body, a contiuous, transversely inflatable loop provided along the attaching marginal edge of the tarpaulin and being closed at one end, the loop being sized for insertion within and withdrawal from the member through the slot when the loop is deflated, and means for supplying pressure to the opposite end of the loop when in the member to transversely expand the loop for sealably and lockably contactng the loop with the member.

3. The combinaton of an open bed truck body having an upwardly extendng headboard at one end thereof, a continuous hollow member having an inner portion sealably fastened to and being coextensive with the vertical edges of the headboard and the longitudinal and rear edges of the body, another portion of the member including a continuous slot providing communication with the interior of the member, a tarpaulin shaped to provide top and side walls and a rear end wall, all of said walls being related to provide full cover for the freight carried by the body, the forward marginal end of the top wall being sealably fastened to the upper end of the headboard and the marginal edges of the side and end walls being shaped as a continuous, transversely expandible loop which is closed at one end, the loop being sized for insertion within and withdrawal from the member through the slot when the loop is deflated, and means for supplying pressure to the opposite end of the loop when in the member to transversely expand the loop for sealably and lockably contacting the loop with the member.

References Cited in the file of this patent

UNITED STATES PATENTS

| 2,448,054 | Seckel | Aug. 31, 1948 |
| 2,700,196 | Panhard | Jan. 25, 1955 |
| 2,743,132 | Zahn | Apr. 24, 1956 |
| 2,757,042 | Schultz | July 31, 1956 |
| 2,807,499 | Duddleston | Sept. 24, 1957 |

FOREIGN PATENTS

| 543,448 | Great Britain | Feb. 25, 1942 |
| 939,611 | Germany | Feb. 23, 1956 |